(12) United States Patent
Stapf

(10) Patent No.: US 6,561,667 B2
(45) Date of Patent: May 13, 2003

(54) ACTUATION MEANS FOR ACTUATING A FUNCTIONAL PART IN AN AUTOMOBILE BY MEANS OF A HANDLE PORTION OR THE LIKE

(75) Inventor: Uwe Stapf, Röttingen (DE)

(73) Assignee: ITW Automotive Products GmbH & Co., KG, Iserlohn (DE)

(*) Notice: Subject to any disclaimer, the term of this patent is extended or adjusted under 35 U.S.C. 154(b) by 0 days.

(21) Appl. No.: 09/933,902

(22) Filed: Aug. 22, 2001

(65) Prior Publication Data

US 2002/0030988 A1 Mar. 14, 2002

(30) Foreign Application Priority Data

Sep. 13, 2000 (DE) .......................... 100 45 171

(51) Int. Cl.$^7$ ................................. F21V 9/16
(52) U.S. Cl. .................. 362/84; 362/501; 362/100; 362/109
(58) Field of Search ............................. 362/84, 85, 501, 362/487, 109, 100

(56) References Cited

U.S. PATENT DOCUMENTS

| 5,709,453 A | * | 1/1998 | Krent et al. | ................. | 362/100 |
| 6,037,865 A | * | 3/2000 | Heinz et al. | ................. | 340/456 |
| 6,086,131 A | * | 7/2000 | Bingle et al. | ............. | 292/336.3 |
| 6,254,261 B1 | * | 7/2001 | Bingle et al. | ................ | 362/100 |

* cited by examiner

Primary Examiner—Sandra O'Shea
Assistant Examiner—Ali Alavi
(74) Attorney, Agent, or Firm—Lowe Hauptman Gilman & Berner, LLP

(57) ABSTRACT

Actuation means for actuating a functional part in an automobile by means of a handle portion or the like, whereby at least a portion, e.g. a stripe of an electro luminescence sheet is applied to a surface of the handle portion or adjacent to the handle portion and connected to an electric source.

20 Claims, 2 Drawing Sheets

US 6,561,667 B2

ACTUATION MEANS FOR ACTUATING A FUNCTIONAL PART IN AN AUTOMOBILE BY MEANS OF A HANDLE PORTION OR THE LIKE

FIELD OF THE INVENTION

The invention relates to an actuation means for actuating a functional part in an automobile by means of a handle portion or the like according to the preamble of claim 1.

BACKGROUND ART

Actuation means in the sense of the invention are the actuators of an automobile door, for example. However, other handle portions for actuating functional parts such as a shift lever of a gear, the actuator of a glove compartment flap or an ash-tray or the like are also possible.

It is possibly difficult to find such actuation means in the dark. Although it is known, for example, to effect a remote control of the central locking of an automobile while simultaneously lighting the interior of the automobile, but it will be difficult to find the door handle even then. The same is true for a door inside actuation means, particularly if the door inside light is not turned on. Of course, comparable things also apply to other actuation means which, in particular, are disposed in the interior of the automobile. Apart from door actuation means, there are more actuation means at the outside, e.g. those for a fuel filler door, the trunk lid or the engine hood. All of these actuation means possibly are difficult to seize in the dark.

SUMMARY OF THE INVENTION

Therefore, it is the object of the invention to provide an actuation means for actuating a functional part of an automobile, which can also be easily recognized in the dark, by means of a handle portion.

It is known to light desired surfaces and parts of the automobile using light-emitting diodes or incandescent lamps. For the parts to be actuated, such lighting devices prove to be useful only to a limited extent because they mostly require a lot of space for their installation and possibly are not always up to the harsh conditions caused by operating them and/or by the climate.

The object of the invention is achieved by the features of claim 1.

In the invention, at least a portion, e.g. a stripe of an electro luminescence sheet, is applied to a surface of the handle portion or adjacent to the handle portion and is connected to an electric power source.

According to an aspect of the invention, the stripe of the electro luminescence sheet is covered by a transparent sheet-like cover. This makes it possible to protect the electro luminescence sheet against mechanical or other impacts.

The power source may have an electric circuitry which is such as to connect it to the electro luminescence sheet permanently or at intervals. Also, it is imaginable to temporarily supply a suitable sheet at the door outside actuation means with a voltage if a remote control of the central locking is effected. It is known to automatically turn on the interior lighting while withdrawing the ignition key in the automobile. If there is a door inside actuation means which is provided with an electro luminescence sheet it could also be turned on temporarily at the same time.

Instead of visibly attaching the luminescence sheet to the handle portion it is also imaginable to mount it in a hidden way so that indirect lighting takes place. As an alternative, the luminescence sheet may be mounted adjacent to the handle portion on an adjoining surface of the automobile, e.g. with a view to lighting the handle portion indirectly.

The stripe-shaped electro luminescence sheet according to the invention may be attached to the surface of the handle portion or another surface by means of a self-adherent layer. The self-adherent layer is conveniently protected by a suitable protective film prior to its use.

In order to protect the stripe-shaped portion of the electro luminescence sheet against mechanical impacts, another aspect of the invention provides that an appropriate pocket that receives the sheet portion be disposed in the surface.

BRIEF DESCRIPTION OF THE DRAWINGS

The invention will now be described in more detail below with reference to embodiments shown in the drawings.

DETAILED DESCRIPTION OF THE INVENTION

Figure 1:
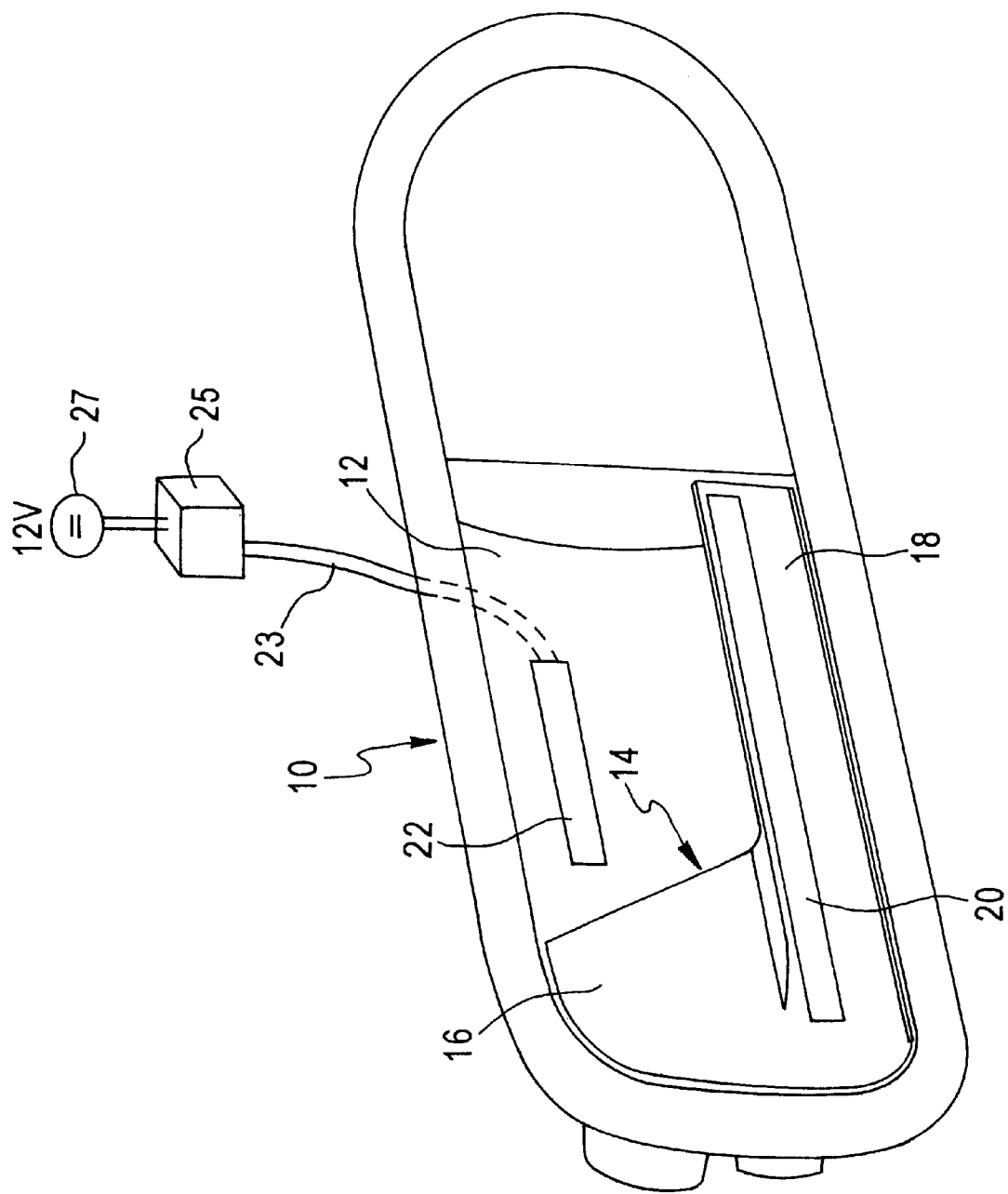
FIG. 1: shows a perspective view of a door inside actuation means according to the invention.

With reference to FIG. 1, a component 10 which, in part, is tray-shaped can be seen and adapted to be inserted in a suitable recess of a door trim panel of an automobile. It is integrally formed from a suitable plastic material. An actuation lever 14 is pivotably supported in a recess 12 facing the interior of the vehicle. It is supported approximately about a vertical axis above the portion 16, which fact is not shown, however. An elongate, narrow portion 18 which is spaced from the bottom of the recess 12 extends to the right from the portion 16 in FIG. 1. When the door is actuated the portion 18 is gripped behind by the fingers of a hand so as to pivot the lever 14 into the interior of the vehicle in order to open the door lock. The parts described are known per sé so that it is unnecessary to discuss more details.

As can be appreciated a narrow stripe 20 extends from portion 16 into portion 18 and is parallel with the latter. The stripe 20 consists of an electro luminescence sheet which is known as such, and is attached by a self-adherent layer, for example. Another stripe 22 which is somewhat shorter is attached to the bottom of the recess 12 in the same way. It will be readily possible to omit one of the two strips 20, 22.

The stripes 20, 22 may be protected by a suitable transparent cover sheet which, for example, is made of PC or PMMA. The stripes 20, 22 may also be disposed in an appropriate pocket, which fact is not shown here, so as not to protrude beyond the surface of the recess 12 or portions 16, 18.

The stripes 20, 22 are connected to an electric connection cable 23 via contacts or connections which are not shown and which lead to a transformer 25 which is disposed in the automobile. It is connected, in turn, to the power supply 27 of the automobile. For example, the transformer converts the voltage of 12 volts into a voltage of 100 V at a frequency of 400 cps. If such a voltage is applied to the stripes 20 or 22 these will give a light and also light the area directly surrounding them so that the passenger of the automobile will be able to discern the handle portion 14 even in the dark and to easily grip it.

The cables leading to the stripes 20, 22 may be embedded in the plastic material from which the handle portion 14 and the component 10 are formed. They may be provided with appropriate connections which are such as to automatically achieve a cable connection to the transformer or a corresponding circuitry during the installation of component 10.

The circuitry, which partially forms part of the transformer, provides that lighting which is desired is brought about at a desired time or during a desired period of time.

Figure 2:
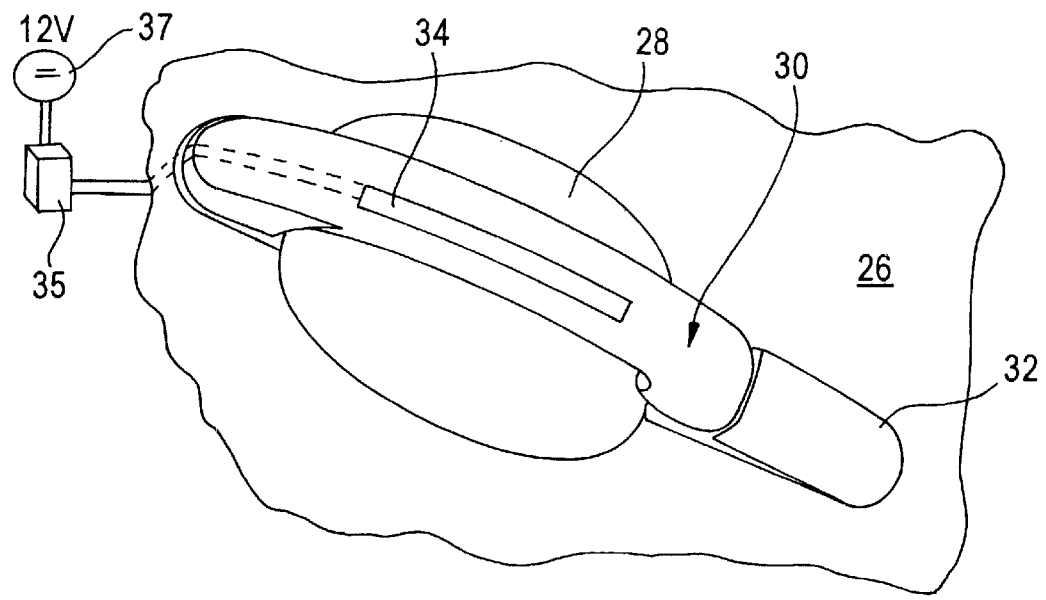
FIG. 2: shows a perspective view of a door outer actuation means.

Referring to FIG. 2, the skin of a door (not shown) of an automobile is outlined at 26, in which skin a hollow 28 is formed. The hollow 26 is bridged over by a bow-like handle portion 30 which can be moved away from the door in a fashion approximately in parallel with itself to open the door lock. A portion 32 which is fixedly connected to the door skin merely serves for protecting the handle portion 30 and to create a gentle transition.

As can be seen the outside of the handle portion 30 has extended thereon a stripe 34, which is formed from an electro luminescence sheet and can be attached in a way which is the same as or similar to the one described in conjunction with the stripe 20, 22 of FIG. 1. The stripe is connected to a transformer 35 which, in turn, is connected to the voltage source 37.

Figure 3:
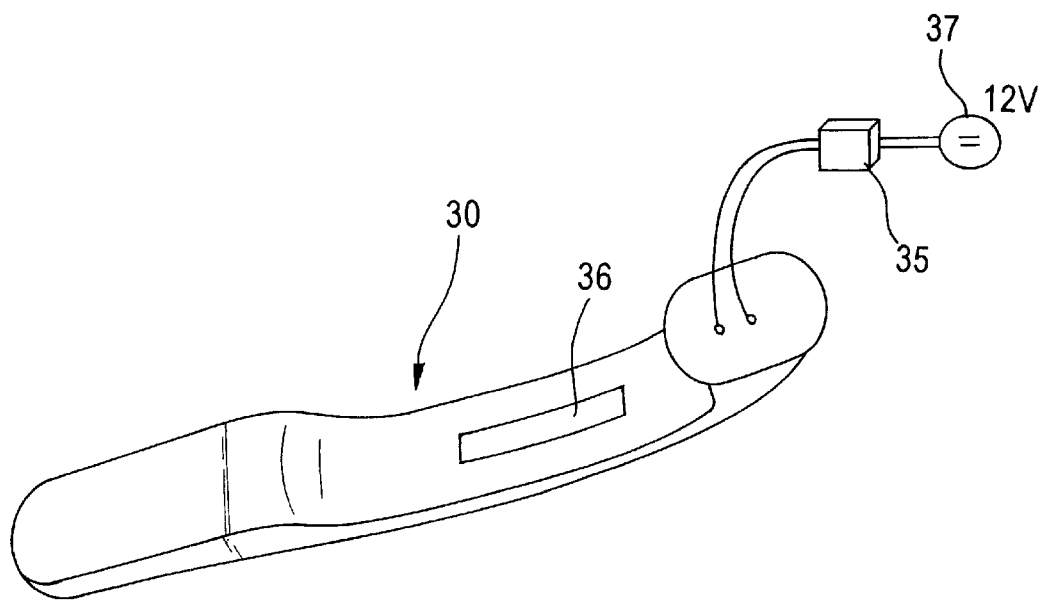
FIG. 3: shows the invisible side of the door outer actuation means of FIG. 2

Referring to FIG. 3, the handle portion 30 is shown as viewed from its rear side. It can be seen that it has a stripe, which is formed from an electro luminescence sheet, at its inside at 36. The way it is attached is comparable to the one of FIG. 1 and FIG. 2 also here. The stripe 36 permits indirect lighting as it lights the surface opposed to the stripe. This also makes it possible for a vehicle passenger to find the handle portion in an easy way. The stripe 36 is also connected to the transformer 35.

What is claimed:

1. A door handle, adapted to be mounted on a door for actuating a lock to open the door, said handle comprising:
    a handle body;
    a sheet made of an electroluminescent material, said sheet being positioned on a side of said body that is adapted to face the door when said handle is mounted thereon; and
    at least one conductor in electrical contact with said sheet.

2. The door handle of claim 1, further comprising a transparent protective sheet covering and protecting said electroluminescent sheet.

3. The door handle of claim 1, further comprising an electric source selectively or permanently connected to said conductor for supplying said sheet with electric power.

4. The door handle of claims 1, wherein said sheet is not visible from an opposite side of said body.

5. The door handle of claim 1, further comprising an adhesive layer applied between said body and said sheet for bonding said sheet to said body.

6. The door handle of claim 1, wherein said body, on the side adapted to face the door, has a surface formed with a depression in which said sheet is received.

7. The door handle of claim 1, wherein said handle is one of an inner door handle and an outer door handle for an automobile door.

8. The door handle of claim 1, wherein said conductor is embedded within said body.

9. The door handle of claim 1, wherein said sheet comprises a stripe of the electroluminescent material, said stripe extending along a longitudinal dimension of said body.

10. The door handle of claim 7, wherein a thickness of said sheet is not greater than a depth of said depression.

11. In combination, a door and a door handle, said handle being mounted on said door for actuating a lock to open said door, said handle comprising:
    a handle body;
    a sheet made of an electroluminescent material, said sheet being positioned on a side of said body that faces the door; and
    at least one conductor in electrical contact with said sheet.

12. The combination of claim 11, wherein said body is a lever member pivotable about a pivot point, at least in a direction away from said door.

13. The combination of claim 12, wherein said sheet is not visible from an opposite side of said body that faces away from said door.

14. The combination of claim 12, wherein said body, on the side that faces said door, has a surface formed with a depression in which said sheet is received.

15. The combination of claim 14, wherein a thickness of said sheet is not greater than a depth of said depression.

16. The combination of claim 12, wherein said door is an automobile door, and said body is positioned on one of an inner side and an outer side of said automobile door.

17. The combination of claim 12, wherein said conductor is embedded within said body, said door comprising a lead in electrical contact with said conductor for connecting said conductor and said sheet to a power source.

18. The combination of claim 12, wherein said conductor is embedded within said body and extends through said pivot point.

19. The combination of claim 12, further comprising an electric source selectively or permanently connected to said conductor for supplying said sheet with electric power.

20. The combination of claim 13, wherein said door has a recess in a region immediately facing said sheet, a surface of said recess being illuminated, and hence visible from the opposite side of said body, by said sheet when power is applied to said conductor.

\* \* \* \* \*